United States Patent
Haffner et al.

(10) Patent No.: US 7,000,820 B2
(45) Date of Patent: Feb. 21, 2006

(54) APPARATUS FOR BRAZING A HEAT EXCHANGER

(75) Inventors: Pascal Haffner, Virming (FR); Johann Simon, Metz (FR); Phillippe Raynal, Sarre-Union (FR)

(73) Assignee: Behr Lorraine S.A.R.L., Hambach Cedex (FR)

( * ) Notice: Subject to any disclaimer, the term of this patent is extended or adjusted under 35 U.S.C. 154(b) by 63 days.

(21) Appl. No.: 10/626,863

(22) Filed: Jul. 25, 2003

(65) Prior Publication Data

US 2005/0029332 A1 Feb. 10, 2005

(30) Foreign Application Priority Data

Jul. 26, 2002 (EP) .................................. 02291895

(51) Int. Cl.
*B23K 31/00* (2006.01)
(52) U.S. Cl. .................... 228/44.3; 165/153; 165/178; 228/183; 29/727
(58) Field of Classification Search ............... 228/183, 228/4.1, 44.3, 49.4; 269/254 R; 29/726, 29/890.045, 890.03, 890.039
See application file for complete search history.

(56) References Cited

U.S. PATENT DOCUMENTS

| | | | | |
|---|---|---|---|---|
| 2,443,574 | A | * | 6/1948 | Burns ........................ 228/183 |
| 4,480,165 | A | | 10/1984 | Haushalter et al. |
| 4,496,818 | A | | 1/1985 | Reynolds et al. |
| 4,911,351 | A | * | 3/1990 | Ishikawa et al. ............ 228/183 |
| 5,205,462 | A | | 4/1993 | Crosier et al. |
| 5,450,997 | A | * | 9/1995 | Turak et al. ................ 228/183 |
| 5,537,839 | A | | 7/1996 | Burk et al. |
| 6,087,633 | A | * | 7/2000 | Lee ............................ 219/392 |
| 6,359,262 | B1 | * | 3/2002 | Robertson et al. .......... 219/407 |

FOREIGN PATENT DOCUMENTS

DE 42 38 853 A1 5/1995

\* cited by examiner

*Primary Examiner*—Jonathan Johnson
(74) *Attorney, Agent, or Firm*—Foley & Lardner LLP

(57) ABSTRACT

An apparatus for brazing a heat exchanger, in particular a flat-tube heat exchanger, comprising a block of flat tubes and corrugated fins. The apparatus comprises a brazing frame that accommodates a tube-fin block within itself and which has two brazing bars arranged parallel to each other which are connected by tie rods. The brazing bars have a plurality of openings that are open toward one side, e.g., notches.

11 Claims, 2 Drawing Sheets

APPARATUS FOR BRAZING A HEAT EXCHANGER

CROSS-REFERENCE TO RELATED PATENT APPLICATIONS

European Priority Application 02 291 895.7, filed Jul. 26, 2002, including the specification, drawings, claims and abstract, is incorporated herein by reference in its entirety.

BACKGROUND OF THE INVENTION

The present invention relates generally to the field of heat exchangers and methods and apparatus for manufacturing heat exchangers. More particularly, the invention relates to an apparatus for brazing a heat exchanger, in particular a flat-tube condenser. According to another aspect, the invention relates to a method for brazing a heat exchanger, and in accordance with yet another aspect, the invention also relates to a heat exchanger.

Heat exchangers, in particular, flat-tube condensers, are used for motor vehicle air-conditioning systems. Heat exchangers of this type are predominantly produced from aluminum alloys and are made by brazing in a brazing furnace. Such flat-tube condensers—as known, for example, from DE-A 42 38 853—comprise a heat transfer network or block, which is built up from a large number of flat tubes and corrugated fins arranged between the tubes, and manifold or header tubes, into which the flat tubes open. The production of a flat-tube condenser built up in this way is carried out in that, first of all, the parts for the block, that is to say the flat tubes and corrugated fins, are joined mechanically (they are "blocked") in a corresponding machine, which is known as the block producer. In order to achieve satisfactory brazing of the corrugated fins to the flat tubes, the assembled block is clamped transversely with respect to the longitudinal direction of the tubes, in order that all the corrugations of the corrugated fins rest uniformly on the flat tubes. In this clamped or compressed state, the block is moved into the brazing furnace, while being held in a brazing apparatus, and is brazed there. When the brazing temperature is reached, the brazing material located on the fins and/or tubes is melted and the entire block "is set." Then, following brazing, the heat exchanger can be removed from the brazing apparatus after it has cooled to at least some degree.

SUMMARY OF THE INVENTION

It is an object of the present invention to provide a brazing apparatus which comprises few parts, is simple in construction and easy to handle.

It is also an object of the invention to provide an improved method for brazing a heat exchanger of the type mentioned above, preferably to the effect that the sequence of method steps for the block production is simplified insofar as brazing is concerned. Also, preferably the production costs of the heat exchanger are reduced.

Another object the invention resides in the provision of an improved heat exchanger made according to the method of the invention.

In accomplishing the foregoing objects of the invention, there has been provided in accordance with one aspect of the invention an apparatus for brazing a heat exchanger that includes a block of tubes and fins, which comprises: a brazing frame which accommodates the block within itself and which comprises two brazing bars arranged parallel to each other and a plurality of tie rods which connect the brazing bars together. Preferably, the brazing bars are at a fixed distance b from each other which corresponds to a width B of the block in a compressed condition suitable for brazing. More preferably, the brazing bars have an open profile which opens toward one longitudinal side and which comprises a plurality of openings therein.

In accordance with another aspect of the invention, there has been provided a method for brazing a heat exchanger that includes a block of tubes and fins, comprising: mechanically joining the tubes and fins to form a block; transversely compressing the block with respect to the longitudinal direction of the tubes to a width dimension B; inserting the block into a brazing frame which has a fixed lateral dimension sufficient to maintain the block in a compressed state suitable for brazing; and brazing the compressed block, while held in the brazing frame, in a brazing furnace.

Further objects, features and advantages of the invention will become apparent from the detailed description of preferred embodiments that follows, when considered together with the accompanying figures of drawing.

BRIEF DESCRIPTION OF THE DRAWINGS

An exemplary preferred embodiment of the invention is illustrated in the drawing and will be described in detail below. In the drawing.

DETAILED DESCRIPTION OF THE PREFERRED EMBODIMENTS

One advantage of the brazing apparatus according to the invention is that the tube/fin block is inserted into the brazing apparatus in the compressed state and can be moved into the brazing furnace together with the brazing apparatus, without further parts being needed for clamping the block (a clamping device) for this purpose. The brazing apparatus comprises a single part, that is to say without any further loose parts. The block can be removed from the brazing apparatus without any aids or tools after brazing.

In order to perform the clamping of the compressed block, two opposite brazing bars belonging to the brazing apparatus are connected to each other by tie rods. The result is uniform pressing and contact between the corrugated fins and the flat tubes.

The two brazing bars advantageously have a profile which includes openings on at least one longitudinal side. Thus, both opposing brazing bars are provided with openings, preferably cut-outs or notches which are open at the top. This makes it possible for the pre-clamped block to be inserted into the brazing apparatus from above by means of a clamping tool which has a plurality, preferably a large number, of pressure fingers that are spaced and have a size corresponding to notches. The pressure fingers are then moved outwardly from the notches, and the clamping of the block is maintained by the brazing bars. The compressed block can thus be inserted into the brazing apparatus without additional aids or tools.

Figure 1:
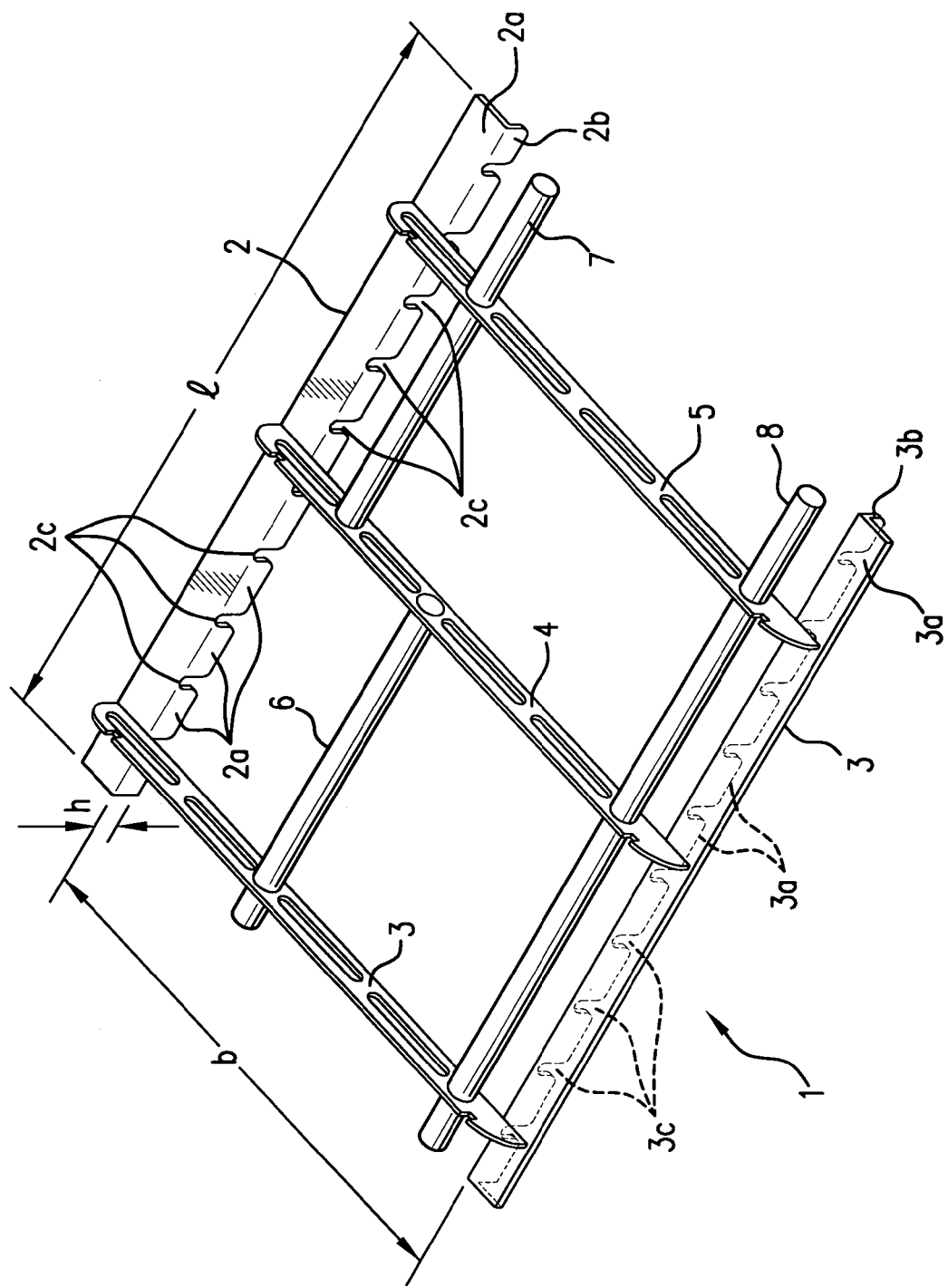
FIG. 1 is a perspective view showing brazing apparatus.

FIG. 1 shows a brazing apparatus 1 that can be used for brazing flat-tube condensers or heat exchangers of similar construction. The brazing apparatus 1 is constructed as a brazing frame and comprises two brazing bars 2, 3 that are arranged parallel to each other and are connected to each other by a plurality of tie rods, in this case three tie rods 3, 4, 5. Arranged transversely with respect to the tie rods 3, 4, 5 are a plurality of transverse spars 6, 7, 8, which are connected permanently to the tie rods, for example, by means of a welded connection, so that the result is a rigid, distortion-free brazing frame 1 having a fixed dimension at least in the lateral direction with respect to the heat exchanger tubes of the block.

The brazing bars 2, 3 are preferably formed as flexurally rigid angled profiles or other rail structures that ensure lateral retention. Preferably the rail structure is an angled profile having two legs 2a, 2b and 3a, 3b, respectively. The legs 2a, 3a are preferably continuous, whereas the angled legs 2b, 3b preferably have an interrupted shape, wherein, for example, the two mutually opposite legs 2b, 3b preferably have a large number of slot-like notches 2c, 3c which (in the illustrated embodiment) are open at the bottom. The notches 2c, 3c are U-shaped in this exemplary preferred embodiment. Other geometric forms of notches, such as, for example, semicircles or triangles open to the outside are likewise possible. The brazing frame 1 has the following dimensions, matched to the heat exchanger to be brazed: length 1, height h and spacing b of the brazing bars 2, 3.

Figure 2:
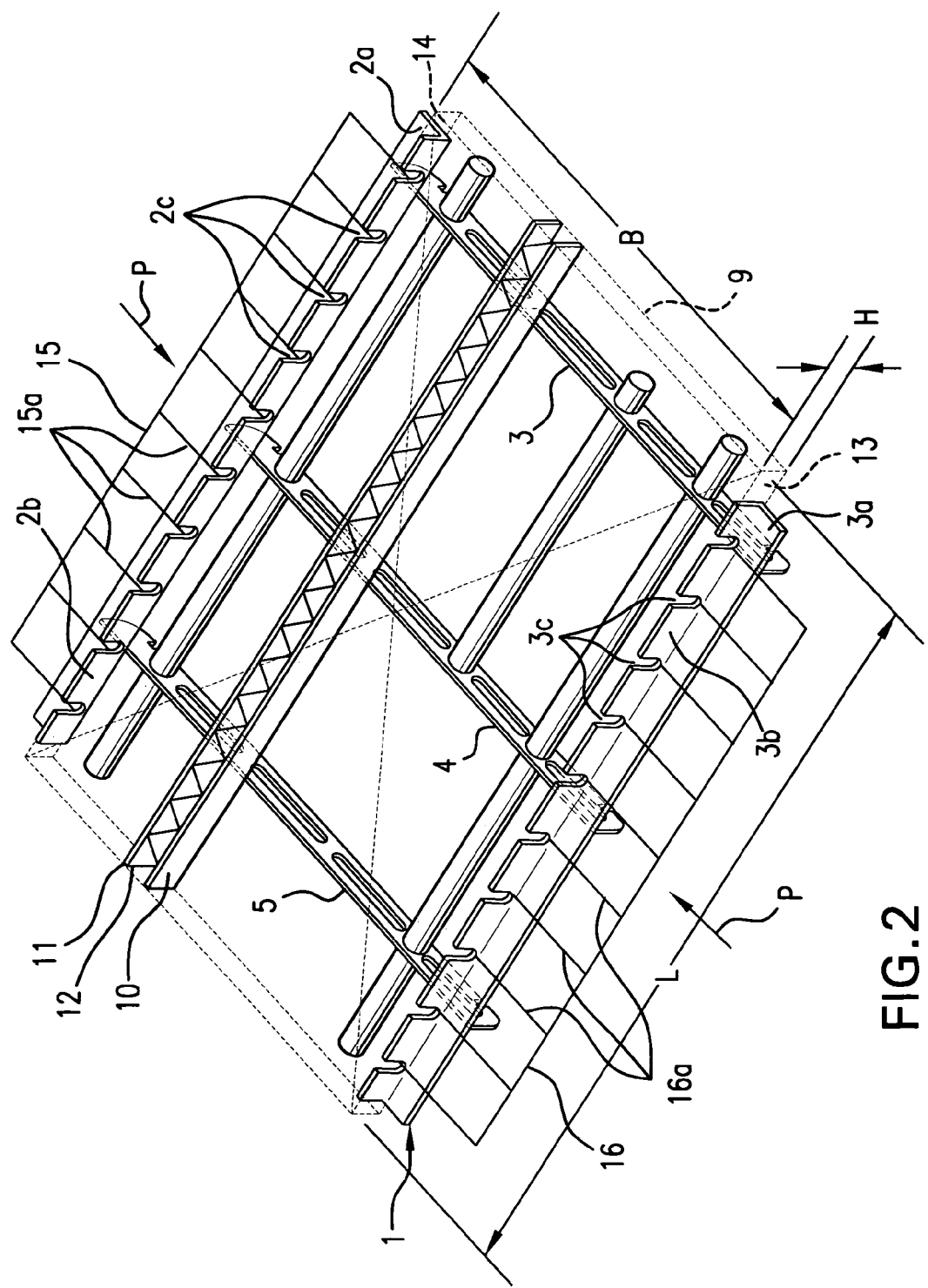
FIG. 2 is a similar view of the brazing apparatus according to FIG. 1, with a block inserted.

FIG. 2 shows the brazing apparatus according to FIG. 1 rotated through 180 degrees, that is to say the legs 2a, 3a of the brazing bars 2, 3 are located at the bottom here, and the notches 2c, 3c are open at the top. The brazing apparatus 1 thus rests on the tie rods 3, 4, 5 on a flat support not illustrated here. A tube/fin block 9 (illustrated dashed) is inserted into the brazing frame 1, that is to say between the brazing bars 2b, 3b, from above. This tube/fin block 9 is illustrated in simplified form as a box-like, flat element, specifically having a length L, a width B and a height H. As already mentioned, such a block comprises a large number of flat tubes and corrugated fins, of which two flat tubes 10, 11 and a corrugated fin 12 arranged between these are schematically illustrated here by way of example. On the longitudinal sides, the block 9 is typically closed off in each case by a side part 13, 14, which is constructed from flat sheet metal strips.

As already mentioned above, the block 9 is assembled ("blocked") in a block producer, not illustrated, and then clamped in order to press flat tubes 10, 11 and corrugated fins 12 against one another. In this clamped state, the block 9 is inserted into the brazing apparatus 1, that is to say between the notched legs 2b, 3b of the brazing bars 2, 3. This is carried out by means of two pressure tools 15, 16, which are illustrated schematically and which preferably each have a correspondingly large number of pressure fingers 15a, 16a which reach through at least some of the open spaces of the notches 2c, 3c.

In a preferred embodiment, the pressure tools 15, 16 therefore can be characterized in a simplified manner as having the shape of a rake, with the pressure fingers 15a, 16a forming the prongs which engage in the notches 2c, 3c. The two pressure tools 15, 16 are pressed against the side parts 13, 14 of the block 9 in the direction of the two arrows P by means of the pressure fingers 15a, 16a, and in this way they hold the block and insert it from above into the brazing apparatus 1. After the block 9 has reached its position in the brazing apparatus 1, the two pressure tools 15, 16 are moved outwardly, that is to say counter to the direction of the arrows P, and the block 9 is left clamped in between the two brazing bars 2, 3.

Before being inserted into the brazing apparatus 1, the block 9 is therefore compressed to a dimension B, which is somewhat smaller than the distance b (FIG. 1) between the brazing bars 2b, 3b, so the block 9 can be inserted with slight play. As soon as the two tools 15, 16 are moved apart, the block 9 springs back because of the elasticity of the corrugated fins and rests with the side parts against the notched legs 2b, 3b of the brazing bars 2, 3. In this case, the appropriate degree of pre-clamping of the block 9 required for the brazing process is still maintained.

The block 9, together with the brazing apparatus 1, is then moved into a brazing furnace (not illustrated), for example, by the brazing apparatus 1 together with the block 9 being set down on a conveyor belt. During the brazing process, corrugated fins and tubes are brazed to one another. After the brazing has been completed, the brazing apparatus 1 with the block is moved out of the brazing furnace and cooled. Subsequently, the block can readily be removed from the brazing apparatus 1, since its width B has been shortened by the brazing process.

Although not illustrated here for reasons of simplification, the block 9 can also be brazed together with bases, and/or the manifold tubes of the condenser and/or with the manifolds and/or connecting tubes. It is only necessary to configure and size the brazing member in a way that corresponds to the final assembly of heat exchanger components that is to be pre-assembled prior to the brazing step.

The present invention has been described with reference to only a few preferred embodiments. Various modifications of the disclosed embodiments will be apparent to persons skilled in this field, and it is intended that the appended claims cover the invention in its broadest sense, including obvious equivalents.

What is claimed is:

1. An apparatus for brazing a heat exchanger that includes a block of tubes and fins, which comprises:
   a brazing frame which accommodates the block within itself and which comprises two brazing bars arranged parallel to each other and a plurality of tie rods which connect the brazing bars together;
   wherein the brazing bars have an open profile which opens toward one longitudinal side and which comprises a plurality of openings therein;
   further comprising a compression device for compressing the tubes and fins together in a direction transverse to the block, said compression device comprising opposing compression members that include a plurality of fingers spaced to cooperate with said openings.

2. An apparatus as claimed in claim 1, wherein the brazing bars are at a fixed distance b from each other which corresponds to a width of the block in a compressed condition suitable for brazing.

3. An apparatus as claimed in claim 2, wherein the brazing bars have a height h and a length l which correspond to the height H and the length L of the block.

4. An apparatus as claimed in claim 1, wherein the tie rods are fixed to the lower longitudinal sides of the brazing bars, and wherein the openings are open toward the upper longitudinal sides of the brazing bars.

5. An apparatus as claimed in claim 4, wherein the openings comprises slots arranged at right angles to the longitudinal side.

6. An apparatus as claimed in claim 1, further comprising transverse spars inter-connecting the tie rods.

7. An apparatus as claimed in claim 1, wherein said openings comprise notches.

8. An apparatus as claimed in claim 1, wherein the brazing frame has a fixed dimension transverse to said block.

9. An apparatus as claimed in claim 1, wherein the brazing bars comprise angled profiles having a continuous leg and a leg comprising a plurality of notches.

10. An apparatus as claimed in claim 1, wherein said tubes are flat tubes and said fins are corrugated fins.

11. An apparatus as claimed in claim 1, wherein the heat exchanger comprises a condenser.

* * * * *